(12) United States Patent  (10) Patent No.: US 6,476,707 B2
Dietrich  (45) Date of Patent: Nov. 5, 2002

(54) POTENTIOMETRIC POSITION SENSORS

(75) Inventor: Frank Hermann Dietrich, Essex (GB)

(73) Assignee: AB Electronic Limited, Essex (GB)

( * ) Notice: Subject to any disclaimer, the term of this patent is extended or adjusted under 35 U.S.C. 154(b) by 0 days.

(21) Appl. No.: 09/740,887

(22) Filed: Dec. 21, 2000

(65) Prior Publication Data

US 2002/0024416 A1 Feb. 28, 2002

(30) Foreign Application Priority Data

Dec. 21, 1999 (GB) .............................................. 9930234

(51) Int. Cl.7 ................................................ H01C 10/32
(52) U.S. Cl. ........................ 338/162; 338/166; 338/190
(58) Field of Search ................................ 338/162, 166, 338/167, 171, 190, 202

(56) References Cited

U.S. PATENT DOCUMENTS 4,184,140 A * 1/1980 Frey, Jr. et al. ............. 338/174
4,223,294 A * 9/1980 Moffitt et al. ................ 338/122
4,430,634 A * 2/1984 Huffrod et al. .............. 338/164
4,626,823 A * 12/1986 Smith .......................... 338/199
5,187,464 A * 2/1993 Forgaes ....................... 338/149
5,343,188 A * 8/1994 Yasuda et al. ............... 338/129
5,838,222 A * 11/1998 Al-Rawi ...................... 338/198
6,028,502 A * 2/2000 McSwiggen ................ 338/167

* cited by examiner

Primary Examiner—Lincoln Donovan
Assistant Examiner—Kyung S. Lee
(74) Attorney, Agent, or Firm—Breiner & Breiner, L.L.C.

(57) ABSTRACT

By using a two-part assembly of a rotary member (10) bearing one or more wipers (14) clipped on to a substrate member (1) bearing one or more tracks (3), subassemblies may be supplied which can be used by manufacturers of articles (20,21,22) in which it is desired to sense the angular position of one member (20) relative to another (22), but which are easy to install and reliable in use. The assembly provides substantial savings in terms of the number of individual components used, thus reducing manufacturing and assembly costs. Manufacturing costs may also be reduced by using track material as a bearing material, as both track and bearing may be applied simultaneously, e.g. by screen printing.

10 Claims, 3 Drawing Sheets

Figure 1:
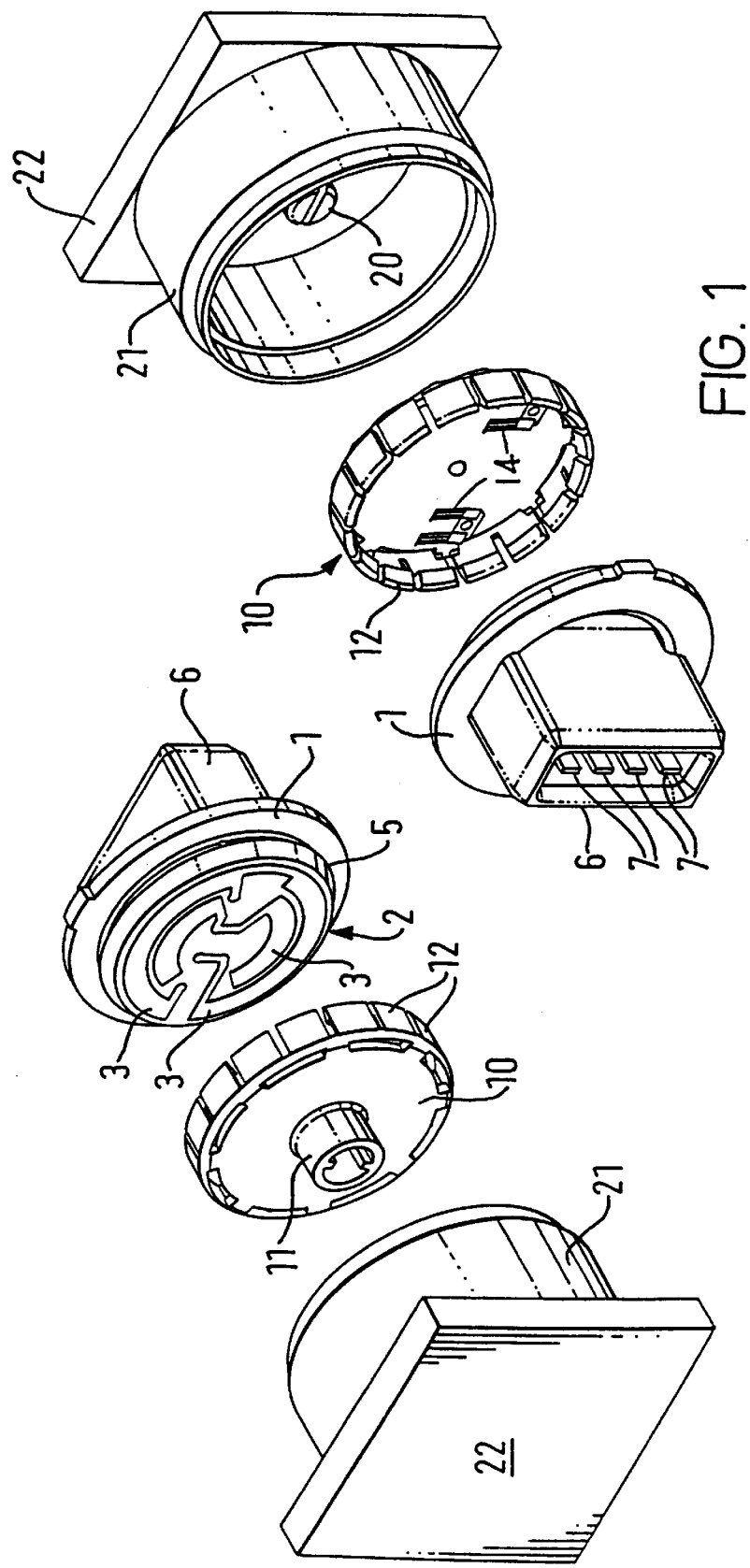

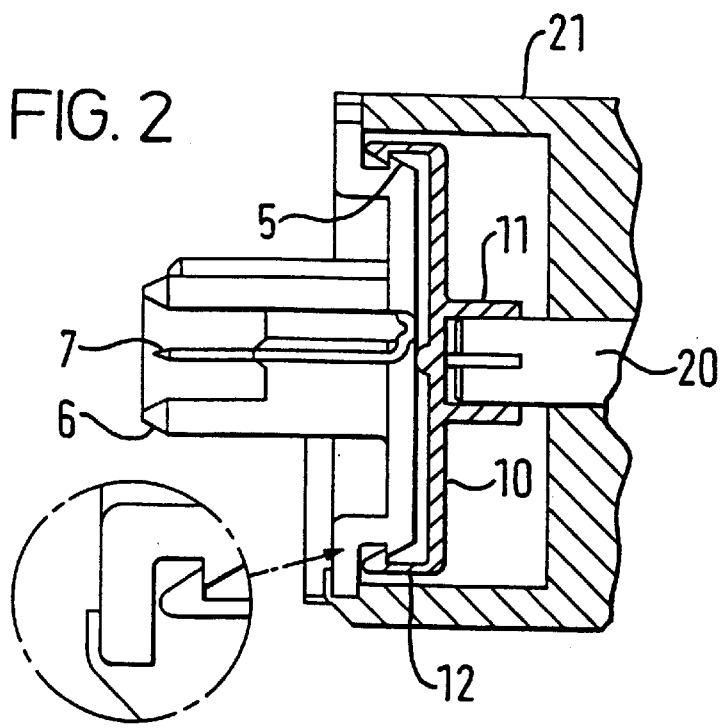
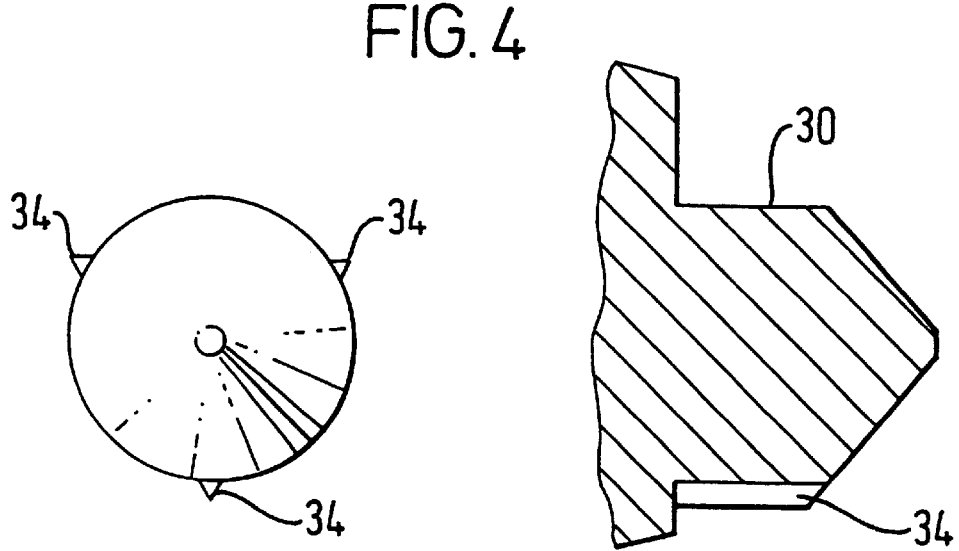

POTENTIOMETRIC POSITION SENSORS

FIELD OF THE INVENTION

This invention relates to potentiometric position sensors.

BACKGROUND TO THE INVENTION

Potentiometric position sensors find widespread application in industry in the measurement of angle or linear position. By fixing one part of a potentiometer to one component and another to another component, relative movement between the components causes a change in the electrical potential sensed by a contact wiper which moves along the track of resistive material. This change may be sensed by suitable circuitry, and used to provide an indication of angle or linear position.

Potentiometers have been manufactured for many decades as self-standing components, usually consisting of a casing within which is an insulating substrate on which a resistive track is present. A wiper is held resiliently against the track and the position of the wiper may be changed by rotation of a spindle or linear movement of a sliding member. Conventionally, the spindle or sliding member has to be attached to a component of which the position needs to be sensed, and the housing likewise attached to a suitable fixed mounting. This can be laborious, prone to error, and it uses a lot of parts.

In recent years, particularly in the automotive industry, where there is increasing use of potentiometric position sensors in a variety of applications within motor vehicles and their engines, an approach to reducing the component costs has resulted in the supply of subassemblies consisting of a potentiometer element comprising a resistive track printed on to an insulating substrate and a wiper contact, usually pre-assembled on an insulating base. The subassembly is then assembled into the particular automotive part concerned, for example a carburettor, by the manufacturer of that part.

In practice, this approach is unsatisfactory, as automotive parts manufacturers are not well equipped to ensure effective error-free installation of the potentiometer parts into the final item; in particular, the clean room conditions appropriate for potentiometer manufacture are not observed, and handling of sensitive components presents problems which require specialised equipment and procedures. The failure rate is unacceptably high, and it is difficult to determine whether failure has occurred because of a defect in the subassembly supplied, or because of problems in integrating it into the final item being manufactured.

OBJECT OF THE INVENTION

It is the object of the invention to provide a new approach to potentiometric sensor design which avoids the disadvantages noted above, and to enable the supply of products to manufacturers which may be simply and easily handled and installed in any item in which it is desired to determine change in the angular position of two relatively movable parts.

GENERAL DESCRIPTION OF THE INVENTION

According to a first feature of the present invention, there is provided a potentiometric position sensor subassembly which consists of an electrically insulating substrate having formed thereon at least one arcuate resistive track and a rotary member bearing at least one wiper member, the substrate and rotary member having mutually engageable clip means formed thereon and configured in such a way that when clipped together the wiper member contacts the track and the rotary member can be rotated about an axis substantially coincident with the centre about which the arcuate track extends.

Preferably, the clip means consists of a circular resilient skirt adapted to engage with a circular formation formed on or in a cylindrical surface. Most preferably, the skirt consists of a series of individually resilient elongate fingers each having at or near its free end a bead or groove, and the cylindrical surface has a corresponding groove or bead formed thereon into which the bead or groove on the fingers may resiliently engage. Such an arrangement enables the subassembly to be simply formed by clipping together the two members under axial force. The mutually engaging formations may be so configured that the members clip together easily, but cannot be easily pulled apart.

Such an arrangement provides protection to both wiper and track, and because the two members are firmly clipped together, they can be shipped as a unit without packaging or handling problems.

Preferably the substrate member comprises means for electrical connection to the track, for example contact terminals in the form of pins, tags or sleeves, configured to form a plug or socket for electrical connection with a complementary socket or plug, e.g. on a wiring harness or loom.

In a particularly preferred arrangement, the substrate member has a generally cylindrical body having on one end face the track(s) and having formed on its other end face a plug or socket incorporating connectors electrically connected to the track(s).

The rotary member preferably has on its face opposite to that bearing the wiper(s) means adapted to engage with one of the components the angular position of which it is desired to measure, for example a suitable socket.

When fitting a subassembly according to the present invention to an article where the relative angular position of two parts thereof is to be sensed, the subassembly does not have to be taken apart, but rather can simply be fitted into place by locating the rotary member in engagement with one component of the part, usually a spindle or shaft, and the substrate memner with respect to another component thereof, usually a housing. Thus the relative positioning of the two members of the subassembly is determined by the relative positioning of parts of the article in question. In order to ensure smooth operation, it is desirable that the two members of the subassembly are relatively loosely fitted on to another, i.e. the rotary member may move slightly in a plane perpendicular to its axis of rotation, so as to accommodate any slight dimensional variation in the articles to which the subassembly is to be fitted. In a particularly preferred embodiment, the rotary member and substrate mamber may have a pin and socket connection set on the axis of rotation of the rotary member, where the exterior surface of the pin includes a plurality of projections which wear differentially as the parts of the subassembly rotate one the subassembly is installed to compensate for any slight play or eccentricity in the relatively movable parts of the article. Alternatively or additionally, the part of the rotary member adapted to engage with part of the article, for example a socket, may, if desired, be mounted e.g. on a resilient set of spokes or so-called spider, the distal ends of which are fixed to the rotary member. Such an arrangement also allows a certain amount of axial play between the spindle or the like on the article and the rotary member when the subassembly has been installed.

The arcuate track(s) and other resistive portion(s) on the insulating substrate are preferably formed of a plastics composition formulated to have appropriate electrical resistance characteristics. Such compositions are often called "conductive plastics inks" because they may easily be applied to substrates by way of printing techniques, particularly screen printing. A major advantage of such materials in connection with the present invention is that they may also act as suitable bearing surfaces. Thus, in particular, the rotary member may be provided with a central bearing surface which is urged against a central area of such plastics film when the sensor is assembled and in use. This constitutes a further feature of the invention, and one which may be applied to a wide variety of potentiometer constructions and designs.

Thus, according generally to a further feature of the invention there is provided a potentiometer construction including an electrically insulative substrate on to which is printed at least one track of resistive material, and wherein the substrate carries in addition one or more areas of such material which, in the assembled potentiometer, act as one or more bearing surfaces.

Such an approach is of particular value in volume manufacture, as it enables bearing features to be provided at the same time as the resistive tracks are laid down, e.g. by screen printing, i.e. there is no need for a separate manufacturing step to provide a bearing surface.

In the potentiometer constructions with the clip-on rotary member, this approach is particularly useful as a central boss member on the rotary member may be arranged to bear on a central area of bearing material, printed at the same time as the tracks, to definine accurately the distance between the face of the rotary member bearing the wiper(s) and the track(s) and accordingly assisting in defining precisely the force with which the resilient wiper member(s) press(es) against the arcuate track(s).

Potentiometric position sensors constructed in accordance with the present invention may be used in a wide variety of applications. They may be easily adapted to fit on appropriate spindles in existing machinery with the insulating substrate being then fixed with respect to the bearing of the spindle, preferably after rotating the spindle a few times to ensure that it and the rotary member can rotate freely with respect to the substrate member.

Although in many cases the sensor of the present invention is designed to be used to sense angular change over a substantial angular range, it should be appreciated that the sensor may be configured to operate over a very small range of angular motion if appropriate. In such a case, the rotary member and substrate member may be configured with only partial arcuate clipping means, i.e. not extending around a full circle.

SPECIFIC DESCRIPTION OF PREFERRED EMBODIMENTS.

Figure 3:
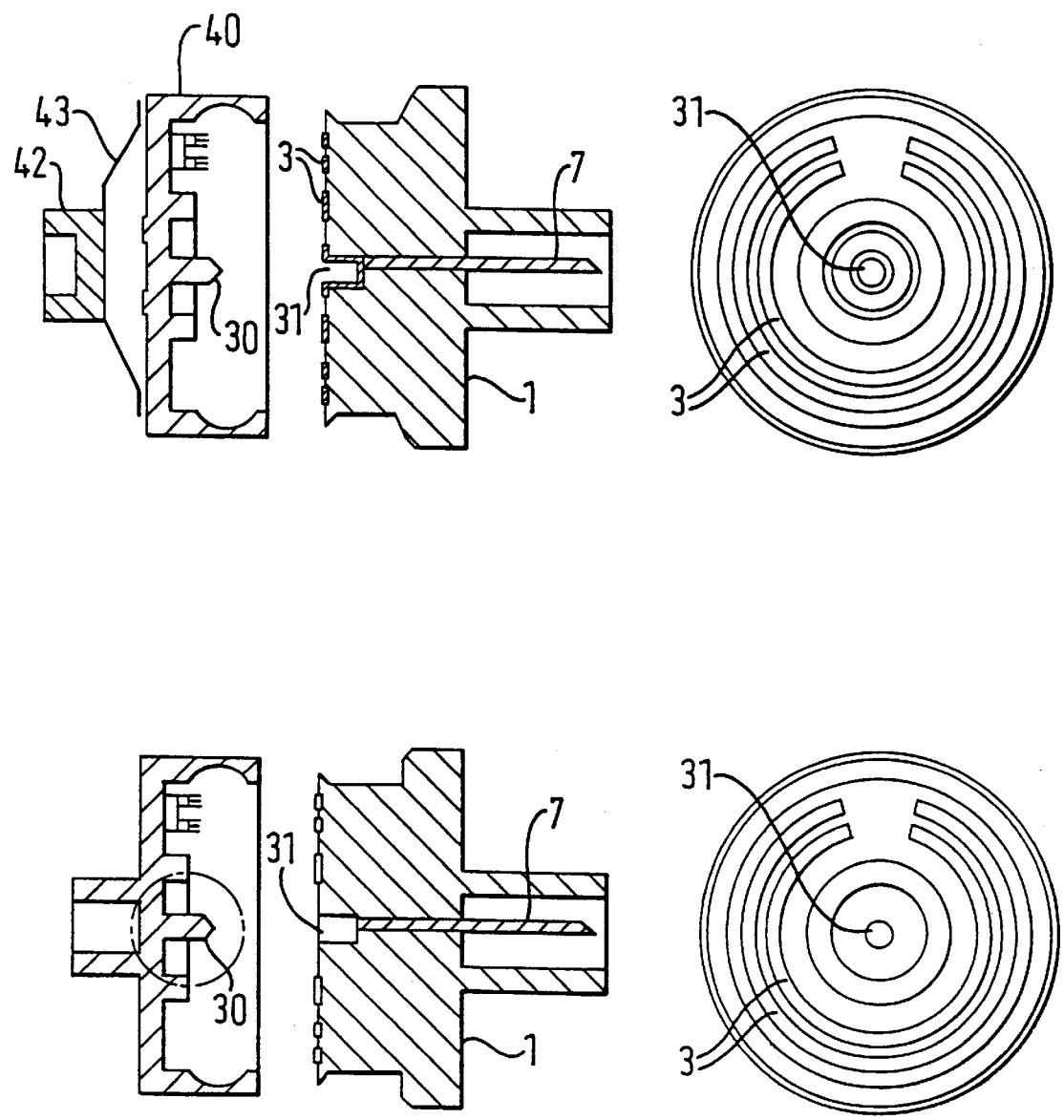

The invention is further explained and illustrated by way of example with reference to the accompanying drawings in which:

FIG. 1 shows an exploded view and from two different directions a rotary potentiometer sensor assembly suitable for fitting to a throttle body, for example forming part of a motor vehicle, FIG. 2 is an axial section through the assembled sensor arrangement of FIG. 1, FIG. 3 is an axial section of alternative rotary and insulative substrats members, and showing a typical printed track arrangement, and FIG. 4 is a section through a further alternative rotary and insulative substrate member again showing the track arrangement and with a detail of a self-centring pin.

Referring first to FIG. 1, this shows an exploded view from two different directions of a rotary potentiometer sensor structure in accordance with the invention. An insulating substrate member 1 moulded from a suitable plastics material includes on one side a circular face 2 on which are a number of pre-printed resistive tracks 3. Around the edge of face 2 runs a bead 5 having a surface inclined towards the centre of face 2. On the other side of the insulating base is an integrally moulded sleeve 6 which serves as a socket for a connector. Conductive tags 7 located within sleeve 6 are electrically connected to the tracks 3.

A rotary member 10 consists of a generally flat disc having an integrally moulded hollow post 11 on one side of it and a set of integrally moulded tabs 12 on the other side, the tabs 12 being separated by relatively narrow slots and constituting together a skirt which can be clipped over bead 5. On the same side of the skirt are mounted two sets of electrically conductive sprung wipers 14.

Post 11 is dimensioned to fit over a spindle 20 which is located within a cylindrical housing 21 which is fitted to the side of a piece of mechanism which is merely indicated diagrammatically and identified by reference number 22. In one application of the invention, the sleeve 21 may be affixed to the exterior of a throttle housing in a vehicle, with spindle 20 then being, for example, the shaft carrying a disc which may be moved to a position in which it substantially lies transverse to a circular airflow passage and in which it substantially blocks flow through that passage, to a position in which it is edge on to the direction of the passage, thus allowing air to flow past it easily.

When the three components shown exploded in FIG. 1 are assembled together, the axial cross-section of the assembly is as shown in FIG. 2 and it can be seen that the tabs 12 clip over the bead 5 to hold the potentiometer assembly together. Spindle 20 is slotted and two axial beads within sleeve 11 engage with the slots in the end of spindle 20 so that if the spindle rotates, so does the rotary member 10. As the rotary member 10 rotates, so the conductive wiper members 14 change their position with respect to the tracks 3, and accordingly the resistance value measurable between two of the tags 7 likewise varies. By connecting tag 7 using a conventional four-way plug member to appropriate instrumentation and control circuitry, a signal may be generated which is representative of throttle position and this may be used, e.g. in the operation of an engine management system.

In the case of the arrangements shown in FIGS. 1 and 2, the centring of the rotary member relative to the insulative base depends entirely on the skirt formed by tabs 12 clipping over bead 5. More accurate centring may be provided as shown in FIGS. 3 and 4 by moulding as part of the rotary member a central stud 30 which fits into a central recess 31 formed on the Moulded insulative substrate member. As shown in FIG. 3, the plastics ink from which the tracks 3 are made is used to line aperture 31 and act as a bearing material.

It is found highly advantageous to make post 30 a fairly loose fit in aperture 31, but to provide it with a number of external ribs 34 which effectively increase the diameter so that it is a tight fit, at least to start with. Because of the narrow area of the tips of ribs 34, they wear slightly as the assembly "beds in" once installed.

As shown in FIGS. 1 and 2, the assembly is fitted together in dimensionally accurate fashion. Very often, however, situations arise where it is desired to fit a potentiometric position sensor to a spindle which may vary in its axial protrusion. In order to compensate for this, the rotary member may be formed in two parts as shown in FIG. 3, via. a base 40 and a socket 42 which is to fit over the spindle, the base and socket being connected via some flexible essentially radial legs denoted 43 in FIG. 3. By choosing an appropriately flexible and resilient material from which to mould the cap, the flexibility of spokes 43 means that variations in the protrusion of a spindle may be compensated for. Alternatively, if the spindle is subject to axial play in use, then this likewise is accommodated, without the angular position sensing function of the assembly being adversely affected.

What is claimed is:

1. A potentiometric position sensor subassembly comprising an electrically insulating substrate, at least one arcuate resistive track formed thereon, a rotary member, at least one wiper member attached to the rotary member, and mutually engageable clip means formed on the substrate and the rotary member, the clip means being configured in such a way that when clipped together the wiper member contacts the track and the rotary member can be rotated about an axis substantially coincident with a center about which the arcuate track extends, wherein the clip means includes a circular resilient skirt which extends around at least part of a circle substantially centered on the axis about which the arcuate track extends, and the substrate includes a circular formation formed on or in a cylindrical surface thereof, the skirt including a series of individually resilient elongate fingers, each having at or near its free end a bead or groove, and the cylindrical surface having a corresponding groove or bead formed thereon into which the bead or groove on the fingers may resiliently engage.

2. A sensor according to claim 1 wherein the substrate member comprises means for electrical connection to the track(s).

3. A sensor according to claim 2 wherein the means for electrical connection to the track(s) includes contact terminals in the form of pins, tags or sleeves, configured to form a plug or socket for electrical connection with a complementary socket or plug.

4. A sensor according to claim 1, wherein the substrate member has a substantially cylindrical body having on one end face the track(s) and having formed on its other end face a plug or socket incorporating connectors electrically connected to the track(s).

5. A sensor according to claim 1 wherein the rotary member has on a face thereof opposite to that bearing the wiper(s) means adapted to engage with one of the components the angular position of which is to be measured.

6. A sensor according to claim 5 wherein the part of the rotary member adapted to engage with one of the components is mounted on a resilient set of spokes, the distal ends of the spokes being fixed to the rotary member.

7. A sensor according to claim 1 wherein the rotary member and the substrate member have a pin and socket connection set on the axis of rotation of the rotary member, where an exterior surface of the pin includes a plurality of projections which wear differentially as parts of the subassembly rotate when the subassembly is installed in an article to compensate for any slight play or eccentricity in the relatively movable parts of the article.

8. A sensor according to claim 1 wherein the arcuate track(s) and other resistive portion(s) on the insulating substrate are formed of a plastics composition applied to the substrate by printing.

9. A sensor according to claim 1 wherein the rotary member is provided with a central bearing surface which is urged against a central area of resistive plastics film printed on the substrate member.

10. A potentiometric position sensor subassembly comprising an electrically insulating substrate, at least one arcuate resistive track formed thereon, a rotary member, at least one wiper member attached to the rotary member, and mutually engageable clip means formed on the substrate and the rotary member, the clip means being configured in such a way that when clipped together the wiper member contacts the track and the rotary member can be rotated about an axis substantially coincident with a center about which the arcuate track extends, wherein the clip means includes a resilient skirt which extends around at least part of a circle substantially centered on the axis about which the arcuate track extends, and the Substrate includes an arcuate formation formed on or in a part cylindrical surface thereof, the skirt including a series of individually resilient enlongate fingers, each having at or near its free end a bead or groove, and the part cylindrical surface having a corresponding groove or bead formed thereon into which the bead or groove on the fingers may resiliently engage.

* * * * *